(12) United States Patent
Kavanaugh

(10) Patent No.: US 8,341,871 B2
(45) Date of Patent: Jan. 1, 2013

(54) FISHING BOBBERS

(76) Inventor: Patrick John Kavanaugh, Eau Claire, WI (US)

( * ) Notice: Subject to any disclaimer, the term of this patent is extended or adjusted under 35 U.S.C. 154(b) by 87 days.

(21) Appl. No.: 13/009,061

(22) Filed: Jan. 19, 2011

(65) Prior Publication Data

US 2012/0180375 A1     Jul. 19, 2012

(51) Int. Cl.
*A01K 91/00*      (2006.01)
(52) U.S. Cl. ......... 43/43.1; 43/44.9; 43/44.92; 43/44.87
(58) Field of Classification Search ....... 292/4; 43/44.9, 43/44.92, 44.93, 44.87, 44.91, 44.95, 44.89
See application file for complete search history.

(56) References Cited

U.S. PATENT DOCUMENTS

| | | | |
|---|---|---|---|
| 458,088 A * | 8/1891 | Lyons | 56/70 |
| 522,167 A | 6/1894 | Rawlings | |
| 668,254 A | 2/1901 | Dickinson | |
| 1,504,884 A | 8/1924 | Garst | |
| 2,315,048 A | 3/1943 | Croft | |
| 2,483,788 A | 10/1949 | Smith | |
| 2,570,293 A | 10/1951 | Vadnais | |
| 2,729,015 A | 1/1956 | Finnegan | |
| 2,778,147 A | 1/1957 | Peck, Jr. | |
| 2,829,464 A | 4/1958 | Pettit, Jr. et al. | |
| 2,827,752 A | 2/1959 | Salzmann | |
| 2,992,508 A | 7/1961 | Schmidt | |
| 3,019,546 A | 2/1962 | Hansen | |
| 3,056,229 A | 10/1962 | Haney | |
| 3,091,050 A | 5/1963 | Metzler | |
| 3,096,599 A | 7/1963 | Baron | |
| 3,273,278 A | 9/1966 | Lynch | |
| 3,733,734 A | 5/1973 | Hysaw | |
| 3,803,749 A | 4/1974 | Boyum | |
| 4,026,062 A * | 5/1977 | Mosley et al. | 43/44.87 |
| 4,361,978 A | 12/1982 | Kane | |
| 4,418,492 A | 12/1983 | Rayburn | |
| 4,458,439 A | 7/1984 | Garrett, Sr. | |
| 4,635,392 A | 1/1987 | Wirkus | |
| 4,656,777 A | 4/1987 | Fernbach | |
| 4,696,125 A | 9/1987 | Rayburn | |
| 5,241,774 A * | 9/1993 | Rayburn | 43/44.9 |
| 5,305,534 A * | 4/1994 | Lazich | 43/44.91 |
| 5,377,444 A | 1/1995 | Gibney, Sr. | |

* cited by examiner

*Primary Examiner* — Kimberly Berona
*Assistant Examiner* — Michael Wang
(74) *Attorney, Agent, or Firm* — Westman, Champlin & Kelly, P.A.

(57) ABSTRACT

Some embodiments of fishing bobbers include a main body portion, a first shaft portion, a second shaft portion, a slot, a first closing mechanism, and a second closing mechanism. Each of the first and second shaft portions has a generally cylindrical shape. The first shaft portion is positioned at one of the outer ends of the main body portion, and the second shaft portion is positioned at an opposite one of the outer ends of the main body portion. The slot runs along a length of the fishing bobber and enables a fishing line to be positioned within a central aperture of the fishing bobber. The first closing mechanism is positioned within the first shaft portion, and the second closing mechanism is positioned within the second shaft portion. The first and second closing mechanisms can be rotated between open and closed positions.

20 Claims, 7 Drawing Sheets

FISHING BOBBERS

BACKGROUND

Fishing bobbers are commonly connected to a fishing line when fishing. Bobbers can serve several functions. One possible function includes controlling the depth of the hook and bait. Another possible function includes providing a signaling mechanism for indicating when a fish is biting at the bait or when a fish has been hooked.

Two types of fishing bobbers include attachment bobbers and slip bobbers. Attachment bobbers are maintained at a fixed position on the fishing line. For instance, some attachment bobbers having a clipping mechanism that securely fastens the bobber to a particular location on the line. Slip bobbers on the other hand are not attached to one particular location along the line and are able to move at least some distance along the line. For instance, a slip bobber may be placed between a hook and a knot in a fishing line, and the slip bobber is able to move between the hook and the knot.

SUMMARY

An aspect of the disclosure relates to fishing bobbers. In one embodiment, fishing bobbers include a main body portion, a first shaft portion, a second shaft portion, a slot, a first closing mechanism, and a second closing mechanism. The main body has a width that increases going from its outer ends towards its center. Each of the first and second shaft portions has a generally cylindrical shape. The first shaft portion is positioned at one of the outer ends of the main body portion, and the second shaft portion is positioned at an opposite one of the outer ends of the main body portion. The slot runs along a length of the fishing bobber and enables a fishing line to be positioned within a central aperture of the fishing bobber. The first closing mechanism is positioned within the first shaft portion, and the second closing mechanism is positioned within the second shaft portion. The first and second closing mechanisms can be rotated between open and closed positions. The slot and the central aperture form one continuous open space when the closing mechanisms are in the open position, and the slot and the central aperture are at least partially separated when the closing mechanisms are in the closed position.

These and various other features and advantages that characterize the claimed embodiments will become apparent upon reading the following detailed description and upon reviewing the associated drawings.

DETAILED DESCRIPTION

Embodiments of the present disclosure include fishing bobbers. One particular example of a fishing bobber 100 is shown in FIGS. 1-6. It should be noted however that embodiments of the present disclosure are not limited to the specific example shown in the figures. Embodiments of the present disclosure illustratively include fishing bobbers having any one or more features or combination of features described in this specification and/or shown in the figures.

Figure 1:
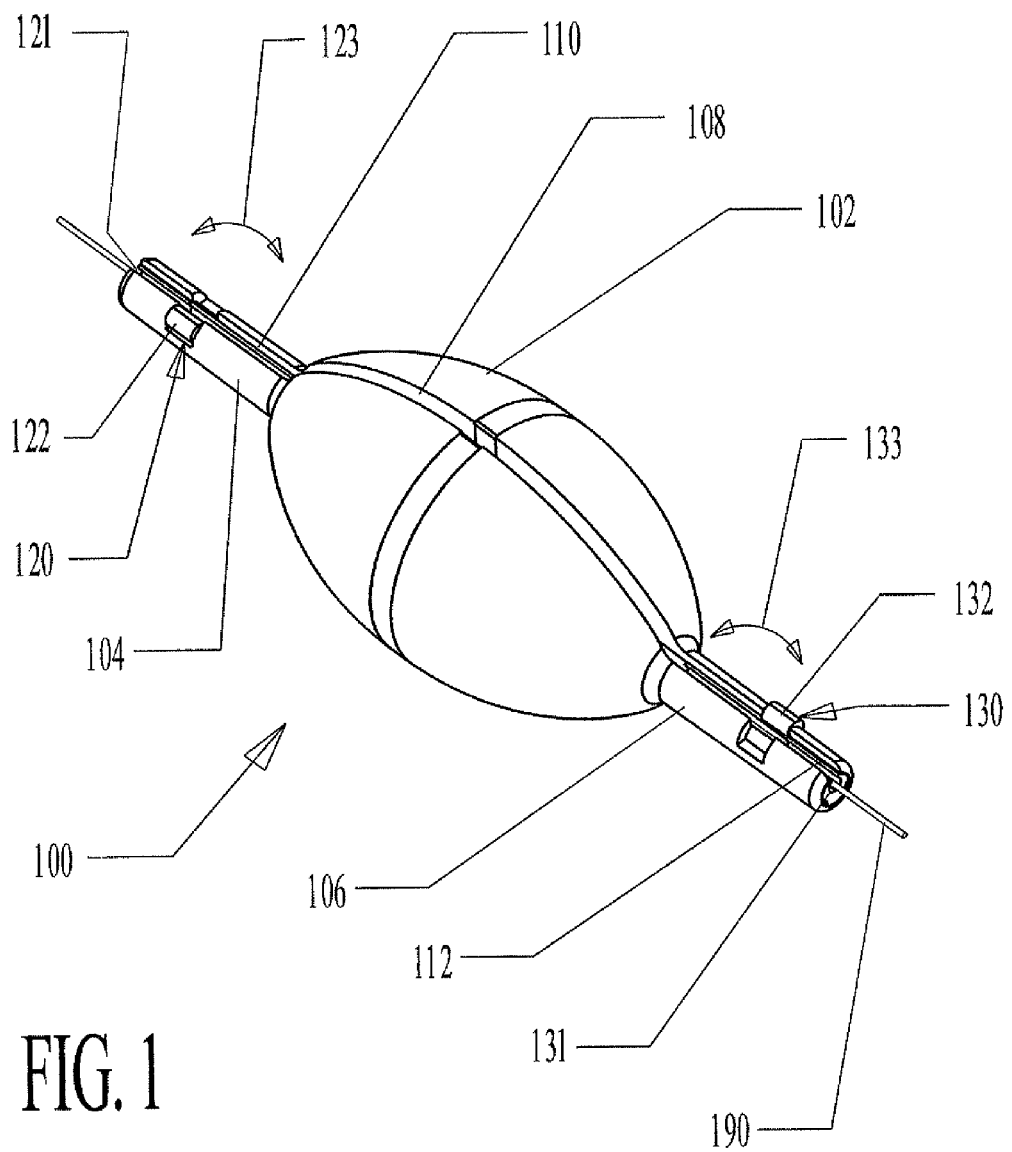
FIG. 1 is a perspective view of a fishing bobber with its closing mechanisms in the open position.

FIG. 1 is a perspective view of bobber 100 having a fishing line 190 running through the bobber. In an embodiment, bobber 100 includes a main body portion 102, a first shaft portion 104, and, a second shaft portion 106. Main body portion 102 includes a slot 108 that extends from an outer surface of the main body portion towards the center of the main body portion. First shaft portion 104 includes a slot 110 that extends from the outer surface of the first shaft portion towards the center of the first shaft portion, and second shaft portion 106 includes a slot 112 that extends from the outer surface of the second shaft portion towards the center of the second shaft portion. The main body slot 108, the first shaft slot 110, and the second shaft slot 112 are illustratively aligned such that they form a channel that runs along the entire length of bobber 100. The width of the channel is greater than the width of fishing line 190 such that fishing line 190 is able to be fit within and run through bobber 100.

Bobber 100 also illustratively includes one or more closing mechanisms for connecting bobber 100 to fishing line 190. In the particular example shown in FIG. 1, bobber 100 includes a first closing mechanism 120 and a second closing mechanism 130. Embodiments are not however limited to any particular number of closing mechanisms and may include more or less than the illustrated two (e.g. 0, 1, 3, 4, etc. closing mechanisms). First closing mechanism 120 includes a slot 121 and a tab 122. First closing mechanism 120 is able to rotate within first shaft portion 104 in the directions shown by arrow 123. Second closing mechanism 130 includes a slot 131 and a tab 132. Second closing mechanism 130 is able to rotate within second shaft portion 106 in the directions shown by arrow 133.

In one embodiment, a user rotates first closing mechanism 120 using tab 122 such that the slot 121 of the first closing mechanism is aligned with the slot 110 of the first shaft portion to form an opening. The user is then able to position fishing line 190 within slot 121 of the first closing mechanism 120. The user similarly rotates second closing mechanism 130 using tab 132 such that the slot 131 is aligned with the slot 112 of the second shaft portion to form another opening. The user is then able to position fishing line 190 within slot 131 of the second closing mechanism 130.

Figure 2:
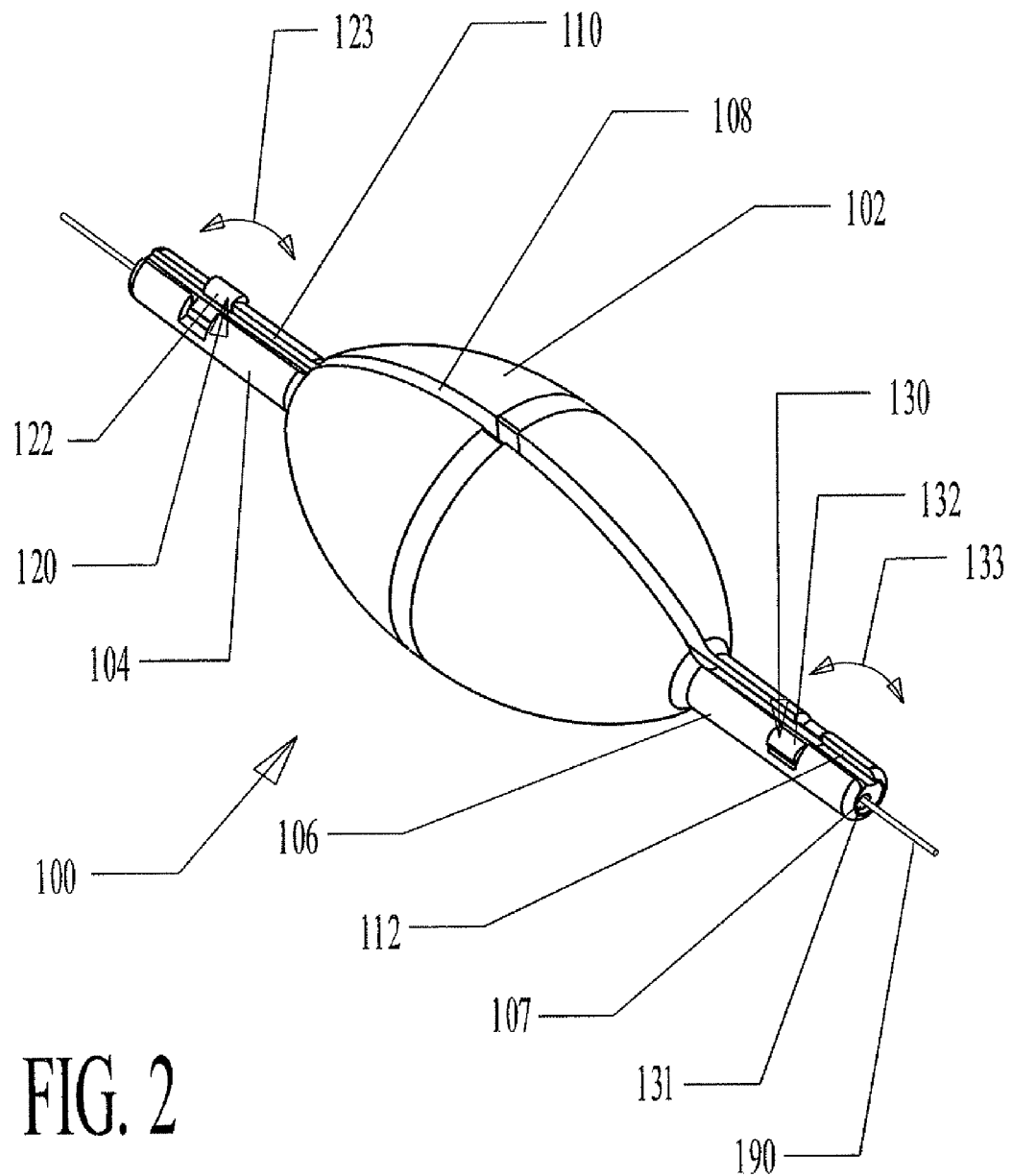
FIG. 2 is a perspective view of a fishing bobber with its closing mechanisms in the closed position.

After fishing line 190 is positioned within the slots of the closing mechanisms and within the main body slot 108, the first closing mechanism 120 and the second closing mechanism 130 are rotated to a closed position to connect bobber 100 to fishing line 190. FIG. 2 shows a perspective view of fishing bobber 100 with closing mechanisms 120 and 130 rotated to their closed positions. In FIG. 2, both the first closing mechanism tab 122 and the second closing mechanism tab 132 have been rotated such that the slots of the closing mechanisms 121 and 131 (shown in FIG. 1) are no longer aligned with the shaft slots 110 and 112 to form openings. As can perhaps be best seen in the bottom right hand corner of FIG. 2, when closing mechanism 130 is rotated into the closed position, fishing line 190 is enclosed within an inner wall 107 of the second shaft portion 106 and the wall of the second closing mechanism slot 131. When first closing mechanism 120 is rotated into the closed position, fishing line 190 is similarly enclosed with an inner wall of the first shaft portion 104 and the wall of the first closing mechanism slot 121. Accordingly, bobber 100 is able to be connected to and released from fishing line 190 by rotating first and second closing mechanisms 120 and 130 into their open and closed positions.

As can be seen in FIG. 2, in one embodiment, fishing line 190 is positioned within the closing mechanisms 120 and 130 such that the fishing line 190 is able to move throughout the length of bobber 100. The surfaces of bobber 100 that may come into contact with fishing line 190 are optionally smooth such that there is a minimal amount of friction between the line 190 and the bobber 100. In such a case, bobber 100 illustratively can be used as a slip bobber. Additionally, as is described in greater detail below, certain embodiments of bobber 100 may also include features that enable the bobber to be used as an attachment bobber as well as a slip bobber.

Figure 3A:
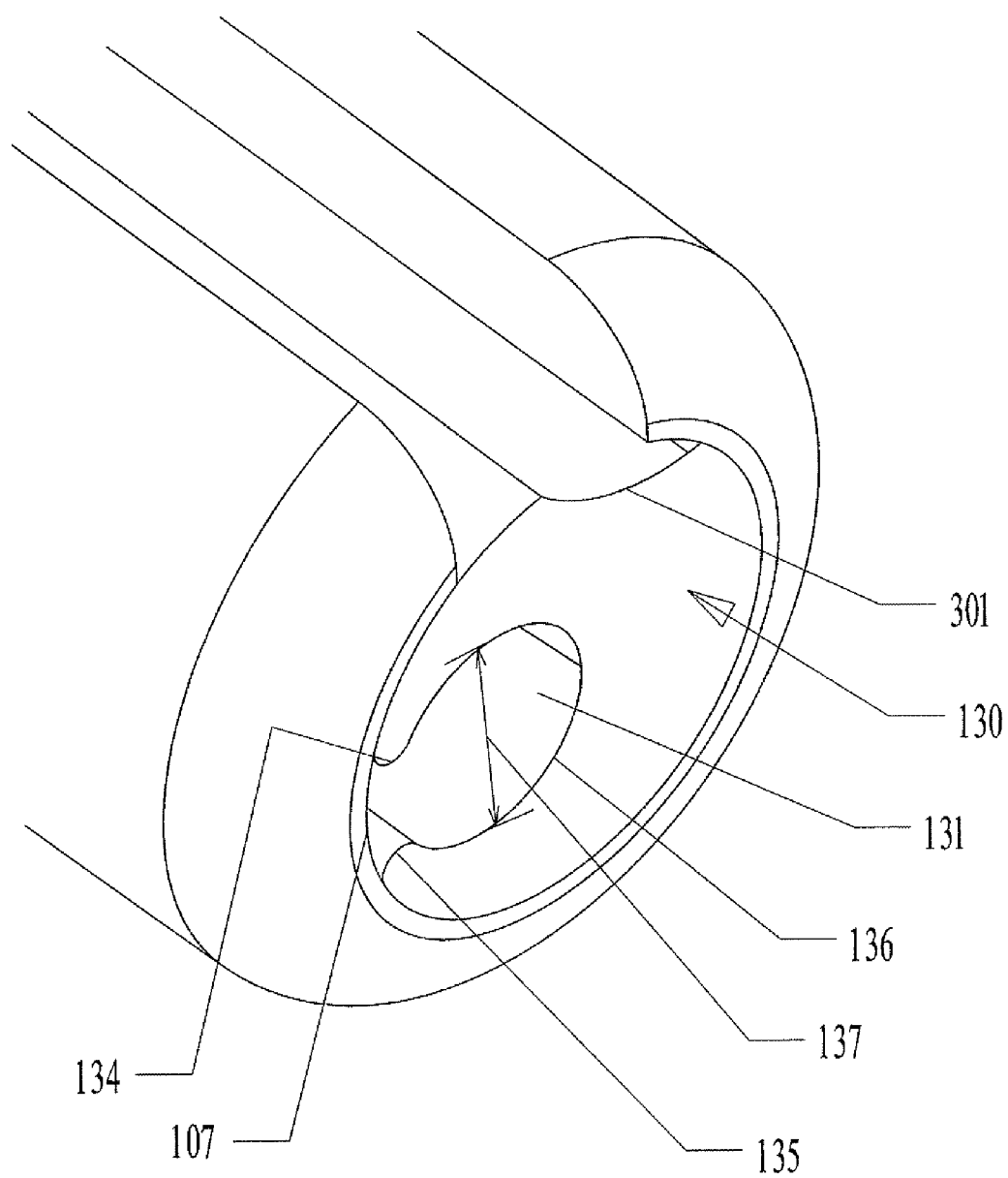
FIG. 3A is a close-up view of a bobber closing mechanism.

FIG. 3A is a close-up view of one illustrative end of a bobber. In the example shown in the figure, closing mechanism 130 includes two different slots that run along the entire length of the closing mechanism. The first slot 131 has a first edge 134, a second edge 135, and a circular wall 136. Circular wall 136 has a diameter 137. In an embodiment, diameter 137 is larger than a diameter of a fishing line to be used with the bobber. Accordingly, when a fishing line is positioned within first slot 131, the bobber is able to freely move along the length of the fishing line and function as a slip bobber. The fishing line is prevented from escaping first slot 131 by an inner wall 107 of the shaft portion FIG. 3A also shows that closing mechanism 130 has a second slot 301. In one embodiment, slot 301 is formed as a shallow groove that runs along the length of the closing mechanism 130. In the example shown in the figure, second slot 301 is formed as one continuous curved surface. Embodiments of second slot 301 are not however limited to any particular configuration and may have a different shape or design.

Figure 3C:
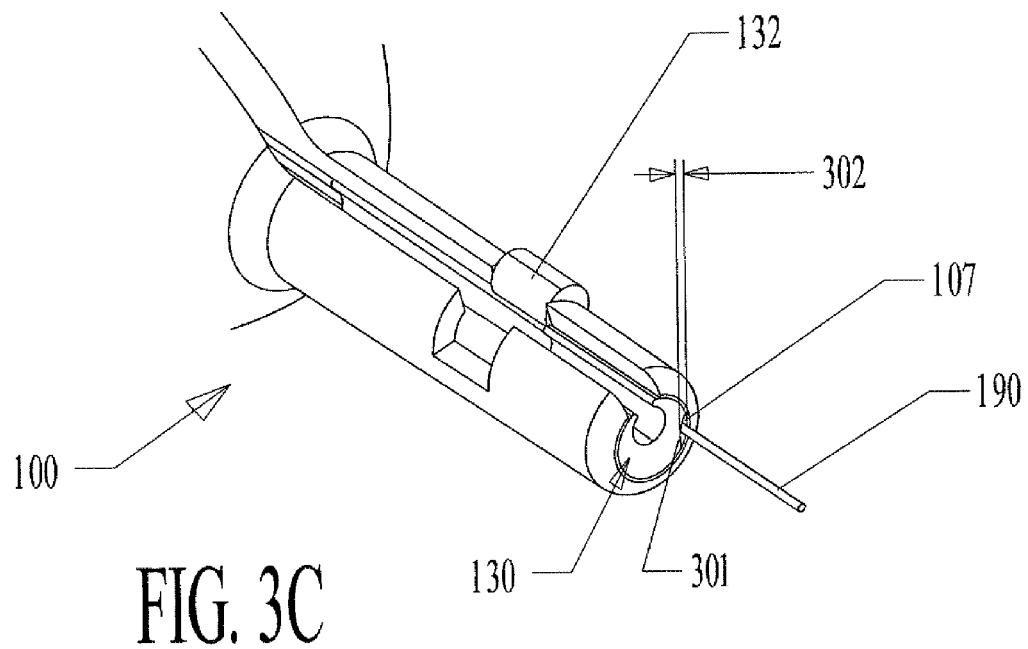
FIG. 3C is a close-up view of a fishing line being enclosed within an "attachment slot" of a bobber.
Figure 3B:
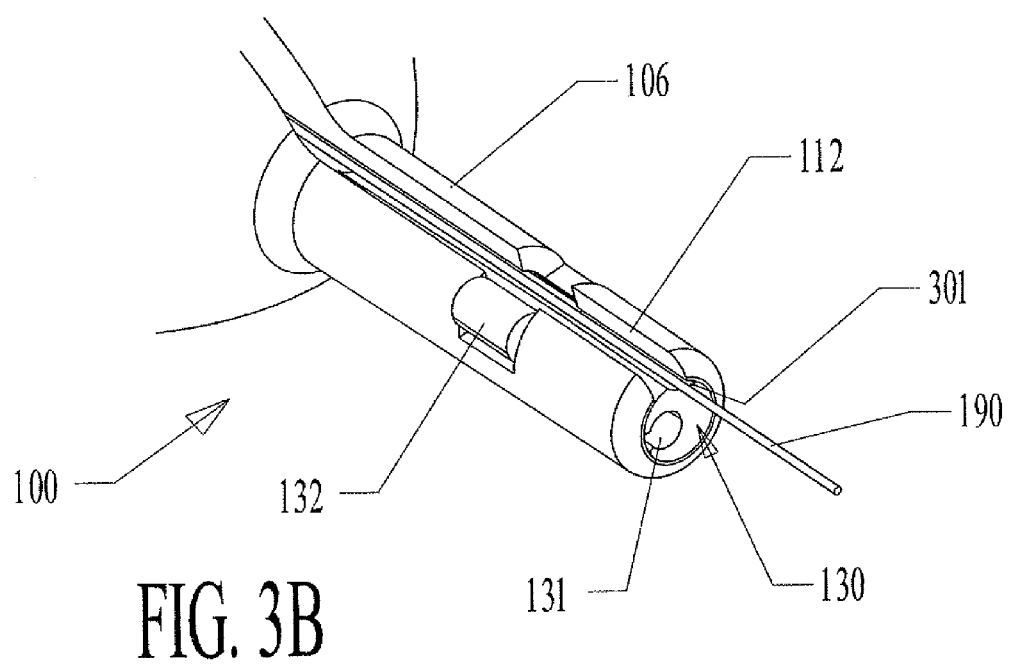
FIG. 3B is a close-up view of a fishing line being placed within an "attachment slot" of a bobber.

FIGS. 3B and 3C show how a fishing line 190 may be connected to fishing bobber 100 utilizing second slot 301. In FIG. 3B, the closing mechanism has been rotated using tab 132 such that the closing mechanism second slot 301 is aligned with the shaft slot 112. This allows for fishing line 190 to be placed within slot 301. In FIG. 3C, the closing mechanism has been rotated using tab 132 such that the closing mechanism second slot 301 is aligned with an inner wall 107 of the shaft portion and not aligned with shaft slot 112. Accordingly, the second slot 310 and the shaft inner wall 107 form an enclosed space that captures fishing line 190.

In an embodiment, second slot 301 has a depth such that the distance 302 between the second slot 301 and the shaft inner wall 107 is less than the diameter/width of fishing line 190. In such an embodiment, fishing line 190 is prevented from moving along the length of second slot 301. Second slot 301 can therefore be used to maintain bobber 100 at a fixed position on fishing line 190. In other words, second slot 301 enables bobber 100 to be used as an attachment bobber.

As can be seen in FIGS. 3A-3C, a closing mechanism 130 may include both a slot 131 that enables a bobber to move along the length of a fishing line (i.e. a "slip slot"), and a slot 301 that enables a bobber to be maintained at a fixed position along the length of a fishing line (i.e. an "attachment slot"). Accordingly, in at least certain embodiments of the present disclosure, one single bobber can function both as a slip bobber and as an attachment bobber depending upon the positioning of the fishing line within the bobber.

Additionally, it should be noted that although FIGS. 3A-3C only show one closing mechanism having two slots (i.e. slots 131 and 301), it should be recognized that each closing mechanism within a bobber (e.g. both closing mechanisms 120 and 130 in FIG. 1) illustratively include two slots. In such an embodiment, a bobber can be used as a slip bobber by enclosing the fishing line within the "slip slots" of each of the closing mechanisms, or the bobber can be used as an attachment bobber by enclosing the fishing line within the "attachment slots" of each of the closing mechanisms. Embodiments of bobbers of the present disclosure are not however limited to any particular design. For instance, bobbers may have only "slip slots," only "attachment slots," or any combination of both "slip slots" and "attachment slots." Also for instance, embodiments of bobbers may have any number of closing mechanisms (e.g. 1, 2, 3, etc.) with any number of slots within each of the closing mechanisms (e.g. 1, 2, 3, etc.).

Figure 4:
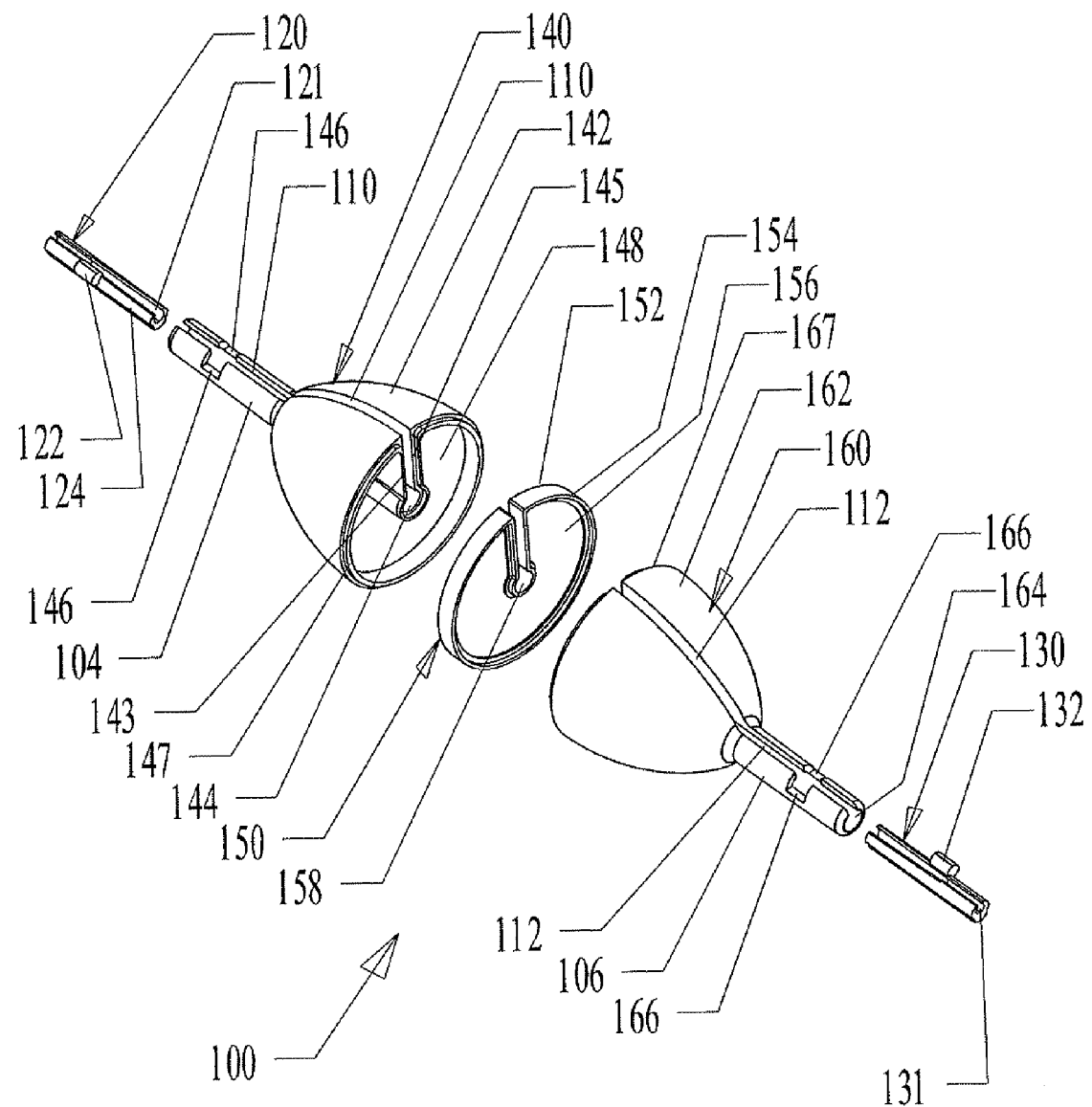
FIG. 4 is an exploded view of a fishing bobber.

FIG. 4 shows an exploded view of bobber 100 with each of the parts of bobber 100 separated from each other. In the embodiment shown in the figure, bobber 100 is made using five pieces. Each of the pieces is optionally made using the same material (e.g. a plastic). However, embodiments of the present disclosure are not limited to any particular construction and may be made using more or less than the illustrated five pieces, and may be made from any material or combination of materials.

Bobber 100 illustratively includes a first closing mechanism 120, a first combined shaft/main body portion 140, a center portion 150, a second combined shaft/main body portion 160, and a second closing mechanism 130. In an embodiment, first and second closing mechanisms 120 and 130 are the same, and first and second combined shaft/main body portions 140 and 160 are the same. This may reduce manufacturing costs by reducing the number of different parts that need to be made. The parts do not however necessarily need to be made to be the same and may be different.

First closing mechanism 120 illustratively includes a tab 122, a generally cylindrical portion 124, and a slot 121. First combined shaft/main body portion 140 illustratively includes a first shaft portion 104, a first main body portion 142, and a central aperture 144 that runs throughout the length of the portion 140. The outer diameter of the closing mechanism generally cylindrical portion 124 is smaller than the diameter of the central aperture 144 such that the first closing mechanism 120 is able to be positioned within the central aperture 144. In particular, first closing mechanism 120 is positioned within shaft portion 104.

First combined shaft/main body portion 140 also illustratively includes a tab channel 146 that runs perpendicular to the slot 110. Tab channel 146 provides space on either side of slot 110 such that tab 122 can be rotated between the open and closed positions. Side walls 143 and 145 run between the central aperture 144 and the outer perimeter of the bobber. Side walls 143 and 145 are illustratively smooth and enable a fishing line to be positioned within and removed from the bobber.

First combined shaft/main body portion 140 optionally includes a ridge 147 that is smaller than a ridge 152 of center portion 150. First combined shaft/main body portion 140 may be connected to center portion 150 by fitting ridge 147 within ridge 152. In an embodiment, first combined shaft/main body portion 140 is hollow such that it has an air space 148. First shaft/main body portion 140 is illustratively connected to center portion 150 such that water cannot or has difficulty entering air space 148. In such a case, air space 148 provides buoyancy to the bobber enabling the bobber to float. In one embodiment, first shaft/main body portion 140 and center portion 150 may be connected using a water resistant adhesive. However, first shaft/main body portion 140 and center portion 150 do not necessarily need to be connected using an adhesive and can be connected by other means (e.g. thermally sealed together, mechanically snap-fit to each other, etc.).

Center portion 150 also illustratively includes a second ridge 154, a cross-sectional member 156, and an aperture 158. In an embodiment, aperture 158 is formed such that it has portions corresponding to the central aperture 144 and sidewalls 143, 145 of the first combined shaft/main body portion 140. Accordingly, aperture 158 allows a fishing line to be positioned within the bobber and optionally run through the bobber (e.g. for the bobber to be used as a slip bobber). Cross-sectional member 156 in at least some embodiments provides mechanical support for the bobber. For example, cross-sectional member 156 may make a bobber more rigid and less compressible. Second ridge 154 is illustratively used to connect second shaft/main body portion 160 to center portion 150. For instance, second shaft/main body portion 160 optionally includes a ridge 167 that is smaller second ridge 154. Second shaft/main body portion 160 can then be connected to center portion 150 by fitting ridge 167 within ridge 154. Second shaft/main body portion 160 may be secured to center portion 150 in the same or similar manner as first shaft/main body portion 150 is secured to center portion 150 (e.g. adhesive or snap-fit). Second shaft/main body portion 160, as well as first shaft main/body portion 140, are not however limited to any particular method of attachment to center portion 150.

In another embodiment, bobber 100 does not include a center portion 150. Instead, first shaft/main body portion 140 is directly connected to second shaft/main body portion 160. Additionally, in yet another embodiment, bobber 100 does not need to include two separate pieces for first shaft/main body portion 140 and second shaft/main body portion 160. Instead, the first shaft/main body portion 140 and second shaft/main body portion 160 are formed as one piece. For instance, a bobber 100 may be constructed from only three pieces such as from two closing mechanisms (e.g. closing mechanisms 120 and 130) and one single combined shaft/main body portion. Embodiments of the present disclosure are not however limited to any particular construction and may be constructed using any of the methods described above or any other methods.

Second shaft/main body portion 160 illustratively includes a second main body portion 162 and a second shaft portion 106. In an embodiment, such as in the one shown in FIG. 4, second shaft/main body portion 160 includes the same or similar components as first shaft/main body portion 140. For instance, FIG. 4 shows that second shaft/main body portion 160 also includes a slot 112, a tab channel 166, and a central aperture 164. Second shaft/main body portion 160 also optionally includes the other parts of first shaft/main body portion 140 such as sidewalls running from the central aperture to the outer perimeter of the bobber and an air space for providing buoyancy.

In one embodiment, second closing mechanism 130 is the same or similar to first closing mechanism 120 and illustratively fits within second shaft/main body portion 160 the same or similar to as how first closing mechanism 120 fits within first shaft/main body portion 140. For instance, in an embodiment, a tab 132 of second closing mechanism 130 fits with a tab channel 166 of the second shaft/main body portion 160, and is used to align a slot 131 of the second closing mechanism 130 with a slot 112 of the second shaft/main body portion 160 to move the second closing mechanism into an open position to receive a fishing line.

Figure 5:
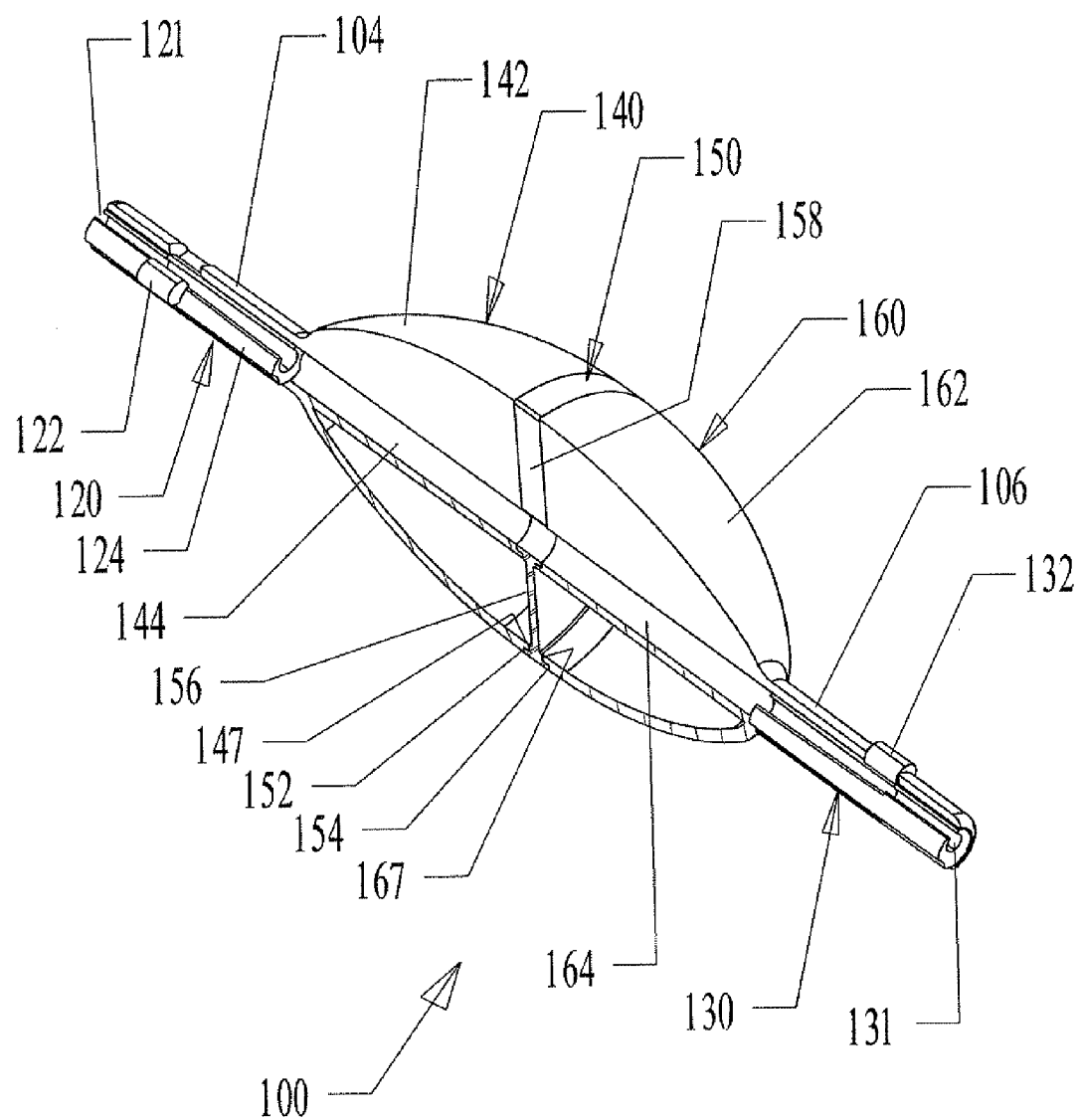
FIG. 5 is a cross-sectional view of a fishing bobber.

FIG. 5 shows a cross-sectional view of the bobber 100. As can be seen in the figure, a slot 121 of first closing mechanism 120, a central aperture 144 of first shaft/main body portion 140, a central aperture 158 of center portion 150, a central aperture 164 of second shaft/main body portion 160, and a slot 131 of second closing mechanism 130 illustratively form one continuous open tubular space that enables a fishing line to be positioned within and run through bobber 100. FIG. 5 also shows how ridge 147 of first shaft/main body portion 140 fits within ridge 152 of center portion 150 to connect the two pieces together in a water resistant manner, and how ridge 167 of second shaft/main body portion 160 fits within ridge 154 of center portion 150 to connect the two pieces together in a water resistant manner. Furthermore, FIG. 5 shows that first shaft portion 104 and first main body portion 142 are formed together as one piece, and that second shaft portion 106 and second main body portion 162 are formed together as one piece.

Figure 6:
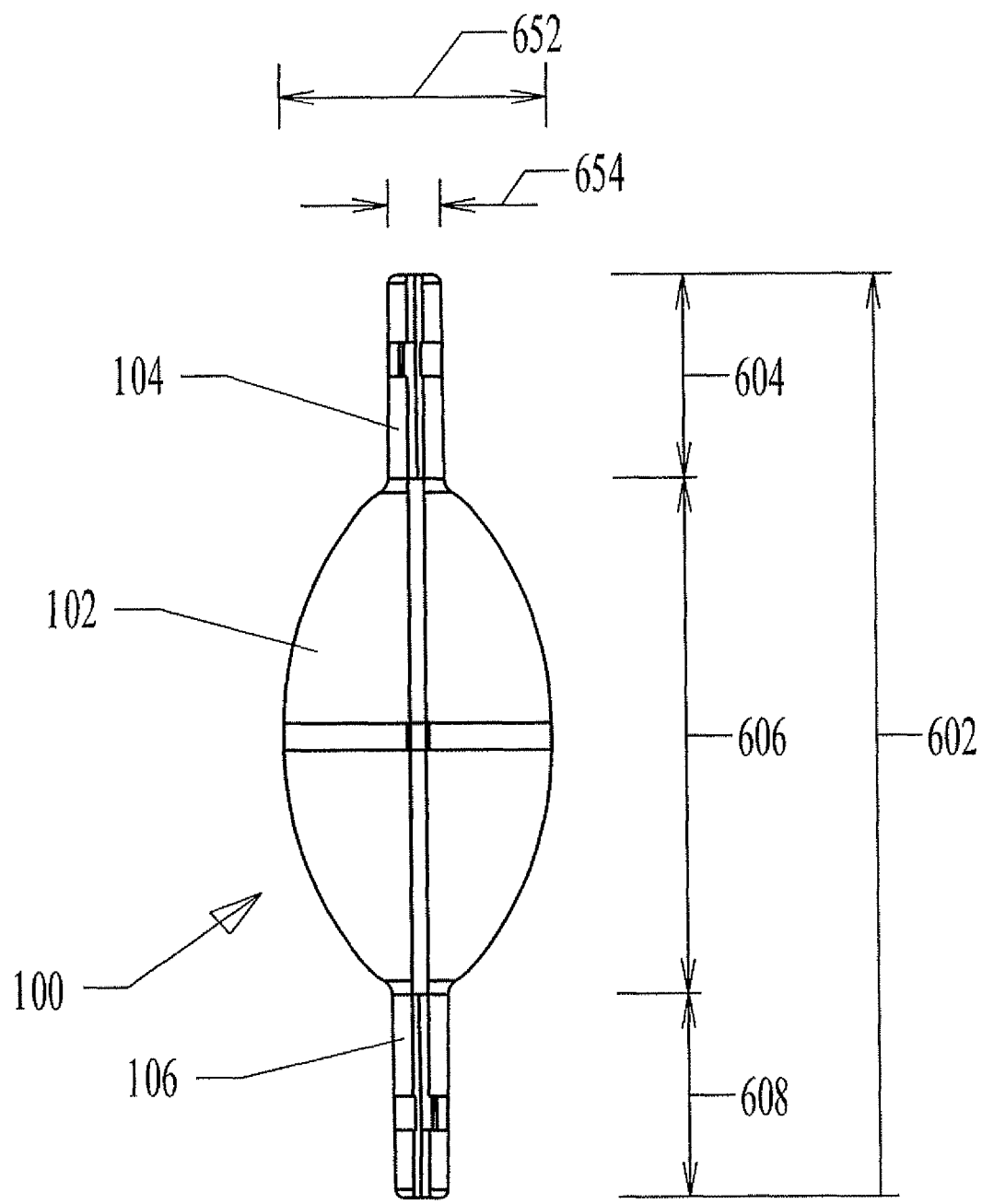
FIG. 6 is a side view of a fishing bobber.

FIG. 6 is a side view of bobber 100. FIG. 6 is useful in showing some of the dimensions of bobber 100. Bobber 100 includes an overall length 602 and a maximum width 652. In an embodiment, overall length 602 is between two and five inches, and maximum width 652 is between half an inch and two inches. Bobber 100 also includes a minimum width 654, a first shaft portion 104 length 604, a main body portion 102 length 606, and a second shaft portion 106 length 608. Minimum width 654 is illustratively between five and thirty percent of the maximum overall width 652. First and second shaft lengths 604 and 608 are each illustratively between five and forty percent of the overall length 602, and the main body portion length 606 is illustratively between forty and ninety percent of the overall length 602. Embodiments of the present disclosure are not however limited to any particular dimensions or ratios, and may include dimensions and ratios outside of those mentioned above.

As can be seen in FIG. 6 and in the other figures, both first shaft portion 104 and second shaft portion 106 have a generally cylindrical shape. The widths 654 of the first and second shaft portions 104, 106 are more or less approximately uniform throughout the lengths 604, 608 of the shaft portions. Additionally, the lengths 604 and 608 of the shaft portions 104, 106 are optionally the same or approximately the same as each other. Main body portion 102 illustratively has a football or oval like shape such that it has a minimal width 654 at its two outer ends and the width increases going towards the center of the main body until the width reaches a maximum width of 652 at the center. Embodiments of the present disclosure are not however limited to any particular shapes or designs, and shapes and designs other than those shown in the figures may be included within embodiments.

As has been described above, embodiments of the present disclosure include fishing bobbers. In some embodiments, fishing bobbers include closing mechanisms that enable the bobbers to easily be connected to or removed from a fishing line by rotating the closing mechanisms between open and closed positions. Bobbers may also have "attachment slots" and/or "slip slots" that enable a bobber to be used as either a slip bobber or as an attachment bobber. Additionally, certain embodiments may be less expensive to manufacture by only including a limited number of separate components. For instance, a shaft and a main body are illustratively combined into one component as opposed to using separate components for the shaft and the main body. Embodiments of the present disclosure also include any other feature or combination of features described above or shown in the figures.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A fishing bobber comprising:
a main body portion having a width that increases going from its outer ends towards its center;
a first shaft portion and a second shaft portion, each of the first and second shaft portions having a generally cylindrical shape, the first shaft portion being positioned at one of the outer ends of the main body portion, the second shaft portion being positioned at an opposite one of the outer ends of the main body portion;
a slot running along a length of the fishing bobber that enables a fishing line to be positioned within a central aperture of the fishing bobber; and
a first closing mechanism positioned within the first shaft portion and a second closing mechanism positioned within the second shaft portion, the first and the second closing mechanisms having outer perimeters that are smaller than inner perimeters of the first and the second shaft portions such that the first and the second closing mechanisms fit within and are surrounded by the first and the second shaft portions, the first and second closing mechanisms being able to rotate between open and closed positions, the slot and the central aperture forming one continuous open space when the closing mechanisms are in the open position, and the slot and the central aperture being at least partially separated when the closing mechanisms are in the closed position, and each of the first and the second closing mechanisms including both an attachment slot and a slip slot, the attachment slot being configured to enable the bobber to function as an attachment bobber that maintains a fixed position on the fishing line, and the slip slot being configured to enable the bobber to function as a slip bobber that is moveable along the fishing line.

2. The fishing line bobber of claim 1, wherein the main body portion comprises a first portion and a second portion, wherein the first and the second closing mechanisms include tabs that extend outward from generally cylindrical portions of the first and the second closing mechanisms, and wherein the first and the second shaft portions include tab channels that are configured to receive the tabs and enable the first and the second closing mechanisms to be rotated between the open and the closed positions.

3. The fishing line bobber of claim 2, wherein the first shaft portion and the first main body portion are formed together as one single piece, and wherein the second shaft portion and the second main body portion are formed together as another single piece.

4. The fishing line bobber of claim 3, wherein the main body portion comprises a center portion positioned between the first and second main body portions.

5. The fishing line bobber of claim 4, wherein the center portion is connected to the first and second main body portions utilizing ridges.

6. The fishing line bobber of claim 1, wherein the main body portion, the first shaft portion, and the second shaft portion are formed together as one single piece.

7. A fishing line bobber comprising:
a main body portion;
a shaft portion connected to the main body portion, the shaft portion including a first aperture that runs along a length of the shaft portion and that is configured to receive a fishing line, the shaft also including second and third apertures that are at least approximately perpendicular to the first aperture, and that are configured to receive a tab; and
a closing mechanism positioned within the shaft portion and having two slots, a first one of the two slots being a slip slot that forms an enclosed space with an inner wall of the shaft portion, the enclosed space having a width that is greater than a width of a fishing line, a second one of the two slots being an attachment slot that forms another enclosed space with the inner wall of the shaft portion, the another enclosed space having a width that is less than the width of the fishing line, and the closing mechanism further including the tab that extends outward from a main body of the closing mechanism, and that fits within the second and the third apertures of the shaft portion, the tab and the second and the third apertures being configured to rotate the closing mechanism between open and closed positions, the closing mechanism including both the attachment slot and the slip slot, the attachment slot being configured to enable the bobber to function as an attachment bobber that maintains a fixed position on a fishing line, and the slip slot configured to enable the bobber to function as a slip bobber that is moveable along the fishing line.

8. The fishing line bobber of claim 7, wherein each of the two slots runs along an entire length of the closing mechanism, and wherein an inner diameter of the shaft portion is larger than an outer diameter of the closing mechanism such that the closing mechanism fits within and is surround by the shaft portion.

9. The fishing line bobber of claim 7, wherein the two slots are parallel to each other.

10. The fishing line bobber of claim 7, wherein the first slot includes two edges connected by a partially cylindrical surface, and wherein the second slot includes one curved surface.

11. The fishing line bobber of claim 7, wherein the closing mechanism includes a tab, wherein the shaft portion includes a tab channel having a first end and a second end, and wherein the closing mechanism is rotated by moving the tab between the tab channel first and second ends.

12. The fishing line bobber of claim 7, wherein the main body portion and the shaft portion are formed together as one single piece.

13. The fishing line bobber of claim 7, wherein the main body portion and the shaft portion are formed together as separate pieces.

14. The fishing line bobber of claim 7, and further comprising:
a second shaft portion connected to the main body portion.

15. The fishing line bobber of claim 14, and further comprising:
a second closing mechanism positioned within the second shaft portion.

16. A fishing line bobber comprising:
a central aperture that extends through a center of the fishing line bobber;
a slot that is connected to the central aperture through sidewalls that extend from an exterior surface of the fishing line bobber inward to the central aperture; and
a closing mechanism having a channel within the central aperture, the closing mechanism being rotatable between an open position and a closed position, the channel of the closing mechanism being aligned with the slot to form one continuous opening between the channel and the slot when the closing mechanism is in the open position, the channel of the closing mechanism being separated from the slot by an inner surface of the closing mechanism when the closing mechanism is in the closed position, the closing mechanism including both an attachment slot and a slip slot, the attachment slot being configured to enable the bobber to function as an attachment bobber that maintains a fixed position on a fishing line, and the slip slot being configured to enable the bobber to function as a slip bobber that is moveable along the fishing line.

17. The fishing line bobber of claim 16, wherein the closing mechanism includes a second channel within the central aperture, the second channel forming an enclosed space with an inner wall of the fishing line bobber that has a width that is less than a width of a fishing line, wherein the bobber includes a shaft portion, and wherein an inner diameter of the shaft portion is larger than an outer diameter of the closing mechanism such that the closing mechanism fits within and is surrounded by the shaft portion.

18. The fishing line bobber of claim 16, and further comprising:
a second closing mechanism.

19. The fishing line bobber of claim 16, wherein the fishing line bobber comprises a shaft portion and a main body portion, and wherein the shaft portion and the main body portion are made at least in part as one unit.

20. The fishing line bobber of claim 17, wherein the fishing line bobber comprises a main body portion that is made of more than one component, and wherein the closing mechanism further includes a tab that extends outward from a main body of the closing mechanism, and that fits within tab channels of the shaft portion.

* * * * *